United States Patent Office 3,682,667
Patented Aug. 8, 1972

3,682,667
HIGH TEMPERATURE INSULATION BLOCK
James R. Roberts, Palatine, and Heber C. Roach, Mount Prospect, Ill., assignors to United States Gypsum Company, Chicago, Ill.
No Drawing. Filed June 18, 1970, Ser. No. 47,612
Int. Cl. C04b 43/02
U.S. Cl. 106—67   6 Claims

ABSTRACT OF THE DISCLOSURE

Improved thermal-insulating material is made from an organic binder, mineral wool, asbestos fiber, clay and a wax-asphalt emulsion.

---

Thermal-insulating blocks are widely used as lining material behind refractory brick and the like in such applications as furnaces and kilns. Such blocks are subjected to extreme variations of temperature, and to very high temperatures for long periods of time, varying with different uses. This tends to lead to dimensional distortion of the blocks, which may become permanent, and consequently to "cracks" in the insulating wall established by the blocks, and thence to loss of the insulation quality and subjection of outside materials and atmosphere to the effects of high heat. It is therefore important to have available insulation blocks of maximum linear and volumetric stability when subjected to wide variations of temperature, including high temperatures for prolonged intervals.

This invention relates to heat-insulating blocks of improved characteristics, and in particular blocks which under prolonged and repeated exposure to extremes of high temperature exhibit minimal change in dimension and shape.

It is an object of the invention to provide a heat-insulating block having low shrinkage and substantially no warpage when subjected continually to variations of temperature from ambient temperatures to the high temperatures which occur in furnaces and kilns in which such blocks may be used.

It is a further object of the invention to provide a heat-insulation block having good resistance to rupture and compressive stresses at all temperatures to which such block is customarily subjected.

It is a further object of the invention to provide a heat-insulation block having low thermal conductivity at the elevated temperatures occurring in furnaces, kilns, and the like.

These objectives are accomplished by the use of a new composition made by the admixture in water slurry of finely-subdivided materials comprising an organic binder, such as starch or a water-activated cellulosic binder having in its original hydrated state a TAPPI drainage freeness of at least 10 minutes, mineral wool, clay, and in a preferred form asbestos fiber and a wax-asphalt emulsion.

Mineral wool is well known as an excellent thermal insulation material, being widely used in applications such as building walls and ceilings, stoves, and the like. In such uses, the extremes of temperature, particularly the higher ranges, are not sufficient to produce in the mineral wool linear or other dimensional changes of consequence. However, for high-temperature uses such as insulation behind refractory brick in furnaces and kilns, where temperatures to at least about 1900° F. occur, even mineral wool alone may incur disadvantageous dimensional changes. According to this invention, combinations of a particular mineral wool with other materials result in a highly stable insulating block suitable for severe-use conditions.

The mineral wool used in the present invention preferably is wool produced from blast furnace slag which is low in iron oxide content and is often referred to as "white wool." The residual iron oxide content is less than 2 to 3%. A particular wool for use in this invention consists (by weight) of about 36.6% silica, 14.6% aluminum oxide, 1.1% iron oxide, 36.5% calcium oxide, and 11.3% magnesium oxide, and about 0.2% acid insolubles, and has a temperature of crystallization of about 2415° F. and becomes molten at about 2450° F. Mineral wool produced from phosphate slag typically has a suitably low iron content, less than about 1%, and may be used in substantial substitution for blast furnace slag wool. Phosphate slag wool may be expected to become molten at about 2300° F. and to crystallize at about 2200° F.

The water-activated cellulosic binder preferred to be used has a TAPPI freeness of at least 10 minutes. The binder is prepared by forming a slurry or furnish of cellulosic material, such as unbleached kraft pulp. The slurry is gelatinized by passing through a series of refining and gelatinizing steps to attain the requisite TAPPI freeness. This hydration is far beyond that commonly used in the paper industry such as in forming glassine paper furnish, and is more fully described in U.S. Pat. No. 3,379,608.

The TAPPI freeness is determined in accordance with the TAPPI Standard T221 os–63 and may be defined as the drainage time in seconds per gram of pulp used in the standard sheet machine at 20° C.

The asbestos preferred in the present invention is a short-fiber asbestos material having an average fiber length of 2.5 millimeters and an average fiber diameter of 0.8 micron. The clay utilized is a fusible ceramic clay, preferably non-swelling and having a high proportion of silica and alumina, such as fire clay, ball clay or the like.

The wax used in the conventional wax-asphalt emulsion may be such as microcrystalline wax or crude or refined paraffin. A suitable emulsion would comprise about 50% asphalt and about 10% wax, by weight, and while not a critical component, usefully may serve as a sizing to stabilize the block in high-humidity storage conditions.

Blocks according to the present invention may be formed by a process comprising forming an aqueous slurry of starch or cellulosic binder material having a TAPPI freeness of at least 10 minutes, admixing a ceramic clay, asbestos fiber, mineral wool, and a wax-asphalt emulsion with the aqueous slurry of cellulosic binder or starch to form an aqueous dispersion having a consistency of about 5–9%, forming a sheet by depositing and accumulating the solids of said dispersion on the screen of a board making machine, compressing the sheet and removing excess water therefrom, cutting the sheet into blanks, drying the blanks, and cutting and trimming the dried blanks into blocks of the desired sizes and shapes.

In a typical installation, the blocks of insulating material are mounted behind the refractory brick of the furnace or kiln, matched tightly together to seal the brick from exterior portions of the installation. As the blocks first become heated to high temperature, the organic binder and the wax-asphalt emulsion, if present, burn out. However, the high temperature causes the clay to fuse and thus to serve as a binder which gives the block continued strength and basic form. The clay should be present in amount at least equal to the organic binder, so as to serve adequately as a binder-replacement.

In addition to the components mentioned above, the compositions may optionally contain certain additives for optimum properties and processing characteristics. For example, alum for sizing, and perlite fines or clay pellets to adjust product density may be included in the formulations, depending on the product characteristics desired.

For a more complete understanding of the invention, reference is made to the following specific examples which are set forth for illustrative purposes only. All percentages are on a dry weight basis.

EXAMPLE I

To 4.5% by weight of an aqueous slurry of a cellulosic binder having a TAPPI freeness of at least 10 minutes and a solids content of 6.6% was added 19.5% ceramic ball clay (Kentucky-Tennessee Clay Co. CTS No. 2), 73% white wool as described above, 1.00% wax-asphalt emulsion (43% solids) and 2% alum to form an aqueous dispersion having a consistency of 7%. A sheet was formed by depositing and accumulating the solids of the dispersion on the screen of a board-making machine, compressing the sheet and removing excess water from the sheet, and cutting the sheet into blanks. The blanks were dried and then cut and trimmed to produce boards or blocks 12" x 12" x 1" in size.

The blocks had a bulk density of 20 pounds per cubic foot (p.c.f.), a modulus of rupture after 24 hours at 220° F. of 48 pounds per square inch (p.s.i.), and a modulus of rupture after 24 hours in water of 25 p.s.i. Pressure to reduce block thickness 10% was 35 p.s.i. after 24 hours at 220° F., and 5 p.s.i. after 24 hours in water.

For testing, a four-inch thick wall of fireclay brick was built in the door of a reheat kiln and covered with a two-inch thick layer of the blocks of this invention. Thermocouples were placed in the wall as follows: (1) at the interface of the fireclay brick and block insulation, (2) in the block insulation one inch from the fireclay brick and (3) on the cold exterior face of the blocks. Using the thermocouples at the interface of the fireclay brick and the block insulation as the control, the furnace was heated to 1900° F. at a rate of 50° F. per hour and held five hours. The temperature was recorded on each thermocouple each hour during the heat and soak period, with an accuracy of about ±5° F. The readings at 500 degree intervals were:

| (1) Interface temperature (° F.) | (2) Temperature 1" from interface (° F.) | (3) Exterior face temperature (° F.) |
|---|---|---|
| 500 | 360 | 170 |
| 1,000 | 660 | 220 |
| 1,500 | 1,069 | 281 |
| 1,900 | 1,377 | 360 |
| 1,900 (hr.) (soak) | 1,395 | 355 |

After 24 hours at 1900° F., the boards showed a linear shrinkage of 2.29% and a volume shrinkage of 8.61%.

The procedure was repeated with two different "dark" mineral wools being substituted for the white wool as described above. Dark mineral wool is made from the slag resulting from the smelting of lead, copper and the like, which has a relatively high iron oxide content. The chemical analysis of each of the three wools used is given in the following table:

EXAMPLE II

| Percent: | White wool | Dark wool #1 | Dark wool #2 |
|---|---|---|---|
| Gain on ignition | 1.5 | 1.1 | 2.6 |
| Acid insolubles | 0.2 | 0.5 | 1.0 |
| Silica ($SiO_2$) | 36.6 | 35.6 | 40.0 |
| Aluminum oxide ($Al_2O_3$) | 14.6 | 15.0 | 12.1 |
| Iron oxide ($Fe_2O_3$) | 1.1 | 12.5 | 36.0 |
| Calcium oxide (CaO) | 36.5 | 29.5 | 6.4 |
| Magnesium oxide (MgO) | 11.3 | 6.3 | 3.1 |

When tested as described above, the blocks made from dark wool #1 had a linear shrinkage of 2.65% and those made from dark wool #2 had a linear shrinkage of 2.97%. These shrinkage figures are in sharp and vital contrast with the 2.29% linear shrinkage of the blocks made with white wool. The 16% increased linear shrinkage of the better of the two dark wool products as compared to the white wool blocks is of great significance in light of the important goal of minimizing breaches or cracks in the insulation sheath surrounding a furnace or kiln.

Of prime importance to this difference in performance of the resultant product is the iron oxide content of the mineral wool component. Iron oxide in relatively minute quantity, such as the 3% or less proportion found in blast furnace or white wool, is essentially an insignificant ingredient of the wool not serving greatly to reduce the melting and/or softening temperature of the wool. The change (reduction) in length of the mineral wool fibers which naturally occurs upon softening and melting of the fibers by heating, thus occurs at a higher temperature than where wool of higher iron oxide content is used. In turn, since the wool is the primary component of the insulating block, the temperature at which the block can be used is greatly increased, thus providing a product of much increased versatility.

Conversely, when the iron oxide is of relative quantity to comprise a significant component or ingredient of the wool, as in dark wools #1 and #2, the softening and melting temperatures of the wool are decreased and the linear shrinkage of blocks made therefrom is increased correspondingly.

EXAMPLE III

The manufacturing method outlined in connection with Example I was followed to make insulating blocks of the following compositions, the wool being blast furnace slag or white wool in each instance:

| | A | B | C | D | E | F |
|---|---|---|---|---|---|---|
| Percent: | | | | | | |
| Clay | 20 | 20 | 18 | 20 | 15 | 12 |
| Cellulosic binder | 4 | 4 | 4 | 4 | 4 | 4 |
| Wool | 64 | 59 | 68 | 59 | 69 | 72 |
| Wax-emulsion | 1 | 1 | 1 | 1 | | |
| Alum | 1 | 1 | | 1 | 1 | 1 |
| Perlite fines | | | | 10 | 1 | 1 |
| Asbestos | 10 | 5 | 9 | 5 | 10 | 10 |
| Clay pellets | | 10 | | | | |

Formulation C had a bulk density of 21.2 p.c.f., and, after drying at 220° F., a modulus of rupture of 46 p.s.i. and a compressive strength of 12 p.s.i., and in these respects exemplifies the group.

The linear and volume shrinkages (percent) after 24 hours at 1900° F. and the resulting moduli of rupture (p.s.i.), were:

| | A | B | C | D | E | F |
|---|---|---|---|---|---|---|
| Linear shrinkage | 1.64 | 1.43 | 1.58 | 1.53 | 1.58 | 1.54 |
| Volume shrinkage | 5.65 | 5.71 | 4.76 | 5.69 | 5.36 | 5.32 |
| Moduli of rupture | 62.6 | 61.7 | 58.2 | 62.2 | 57.4 | 43.6 |

After 24 hours in a reheat kiln at the temperatures indicated, blocks of Example III–C showed the following:

| Percent | Linear change | Volume change |
|---|---|---|
| 2,000° F | 1.38 | 4.32 |
| 2,100° F | 1.62 | 13.60 |

The appearance after the 1900° F. heat was of a dark pink color and fairly soft texture, and the appearance after the 2000° F. heat was about the same. After the 2100° F. heat, the top part of the block showed some fusing.

EXAMPLE IV

The procedure of Example I was repeated to make boards according to the composition of Example III–C. In one case, A–10 asbestos again was used and in the other, chrysotile 4-T asbestos was used. Shrinkage tests, using a reheat kiln, gave the following results:

|  | Example III-C with— | |
|---|---|---|
|  | A-10 Asbestos | Chrysotile 4-T asbestos |
| Measured density (p.c.f.) | 18.0 | 18.4 |
| 1,900° F., 24 hrs., percent: |  |  |
| Linear change | 1.25 | 2.35 |
| Volume change | 7.19 | 8.82 |
| 2,000° F., 24 hrs., percent: |  |  |
| Linear change | 1.18 | 2.36 |
| Volume change | 7.44 | 11.73 |
| 2,100° F., 24 hrs., percent: |  |  |
| Linear change | 8.29 | 3.53 |
| Volume change | 35.32 | 13.10 |
| 2,200° F., 24 hrs., percent: |  |  |
| Linear change | Melted | Melted |
| Volume change |  |  |

From the above test results, it is seen that our heat insulated block made from white wool of relatively low iron oxide content has clearly superior linear-shrinkage characteristics compared to a block made from dark wool of a relatively high iron oxide content, and further is characterized by excellent qualities as to volume shrinkage, modulus of rupture, and comprehensive strength, when subjected to operative temperatures to at least about 1900° F.

Having thus described and exemplified our invention, we claim:

1. A heat-insulating block characterized by having a substantial dimensional stability to a temperature of at least about 1900° F., said block consisting essentially of a major proportion of slag-derived mineral wool having an iron oxide content not exceeding about 3% by weight of the wool, a water-activated essentially nonfibrous, gelatinous cellulosic binder having in its original state a TAPPI drainage freeness of at least 10 minutes initially to retain the shape and dimension of the block as formed, and a clay fusible at a temperature above about 1600° F., whereby said clay forms a replacement for said binder when the block is exposed to temperatures in excess of about 1600° F. for a time sufficient to burn out said binder, said clay being present in the block in an amount at least about equal to the amount of said binder.

2. A heat-insulating block according to claim 1, in which said mineral wool is blast furnace slag mineral wool.

3. A heat-insulating block according to claim 2, in which the iron oxide content of the mineral wool is less than about 2% by weight thereof.

4. A heat-insulating block according to claim 3, further including a wax-asphalt sizing to stabilize said block upon initial formation.

5. A heat-insulating block according to claim 4, in which, by dry weight of the block as formed, said block comprises at least about 60% mineral wool, 4% binder, 12% clay and 1% wax-asphalt sizing, and further including at least about 5% asbestos fiber.

6. A heat-insulating block according to claim 1, in which, by dry weight of the block as formed, said block comprises at least about 60% mineral wool, 4% binder and 12% clay.

References Cited
UNITED STATES PATENTS

| | | | |
|---|---|---|---|
| 3,103,444 | 9/1963 | Cotts | 106—67 |
| 3,321,171 | 5/1967 | Gorka et al. | 106—69 |
| 3,510,394 | 5/1970 | Cadotte | 106—41 |

JAMES E. POER, Primary Examiner

U.S. Cl. X.R.

252—62

PO-1050
(5/69)

UNITED STATES PATENT OFFICE
CERTIFICATE OF CORRECTION

Patent No. 3,682,667             Dated August 8, 1972

Inventor(s) James R. Roberts and Heber C. Roach

It is certified that error appears in the above-identified patent and that said Letters Patent are hereby corrected as shown below:

In col. 2, line 68 the last word "For." should read --For--.

In col. 3, line 47, the first column of the last line of the table reading "1,900 (hr.) (soak)" should read --1,900 (5 hr.) (soak)--.

Signed and sealed this 23rd day of January 1973.

(SEAL)
Attest:

EDWARD M. FLETCHER, JR.             ROBERT GOTTSCHALK
Attesting Officer                     Commissioner of Patents